United States Patent
Parmenter et al.

(10) Patent No.: US 7,300,271 B2
(45) Date of Patent: Nov. 27, 2007

(54) INJECTION MOLD INSERT BLOCK ALIGNMENT SYSTEM

(75) Inventors: Philip Parmenter, Reading (GB); Guido Drees, Lubbecke (DE); Robert Dietrich Schad, North York (CA)

(73) Assignee: Nokia Corporation, Espoo (FI)

( * ) Notice: Subject to any disclaimer, the term of this patent is extended or adjusted under 35 U.S.C. 154(b) by 57 days.

(21) Appl. No.: 11/292,270

(22) Filed: Dec. 1, 2005

(65) Prior Publication Data
US 2007/0128305 A1    Jun. 7, 2007

(51) Int. Cl.
B29C 33/30    (2006.01)
(52) U.S. Cl. .................... 425/190; 425/195; 425/468
(58) Field of Classification Search ............... 425/190, 425/193, 195, 468, 472
See application file for complete search history.

(56) References Cited

U.S. PATENT DOCUMENTS

| | | | | |
|---|---|---|---|---|
| 4,202,522 A | | 5/1980 | Hanas et al. ................ 249/102 |
| 4,416,604 A | | 11/1983 | Bender et al. .............. 425/183 |
| 4,661,055 A | | 4/1987 | Thivichon-Prince et al. .......................... 425/556 |
| 4,678,158 A | * | 7/1987 | Brock ........................ 249/161 |
| 4,828,479 A | * | 5/1989 | Pleasant ................. 425/192 R |
| 5,281,121 A | | 1/1994 | Tsutsumi et al. ........... 425/116 |
| 5,662,946 A | | 9/1997 | Pratt et al. ................. 425/190 |
| 5,753,275 A | * | 5/1998 | Takahashi et al. ......... 425/186 |
| 5,762,977 A | * | 6/1998 | Boskovic .................... 425/225 |
| 5,769,554 A | * | 6/1998 | Slocum ........................ 403/13 |
| 5,869,111 A | * | 2/1999 | Takahashi et al. .......... 425/589 |
| 6,126,434 A | * | 10/2000 | Takahashi et al. .......... 425/589 |
| 6,328,552 B1 | * | 12/2001 | Hendrickson et al. ...... 425/190 |
| 6,558,145 B2 | * | 5/2003 | Wieder ........................ 425/190 |
| 6,796,016 B2 | | 9/2004 | Persson ........................ 29/558 |

FOREIGN PATENT DOCUMENTS

| | | |
|---|---|---|
| EP | 0714746 | 6/1996 |
| JP | 3207624 | 9/1991 |
| JP | 6260519 | 9/1994 |
| JP | 8072103 | 3/1996 |
| JP | 2002-321222 | 11/2002 |
| JP | 2003-103573 | 4/2003 |

* cited by examiner

*Primary Examiner*—James Mackey
(74) *Attorney, Agent, or Firm*—Ware, Fressola, Van Der Sluys & Adolphson

(57) ABSTRACT

Alignment bars are mounted to a core or cavity insert block and a portion of one end of the alignment bar projects above the plane of a molding face surface and engages with a corresponding respective mating alignment channel in the other of the core or cavity insert block when the blocks are moved into a closed operative position. A portion of the other end of the alignment bar projects below the plane of a mold base plate facing surface defining keys for insertion into pockets formed in the mold base plate of a mold base for precise fixed positioning of the insert block on the mold base plate. The other insert block is carried by a co-operating mold base and the position of the insert block is moved into alignment with the insert block mounted on the other mold base.

17 Claims, 5 Drawing Sheets

INJECTION MOLD INSERT BLOCK ALIGNMENT SYSTEM

TECHNICAL FIELD

The present invention relates generally to injection molding and injection mold tooling and deals more particularly with an alignment system for insert blocks used in injection mold tools.

BACKGROUND OF THE INVENTION

In the prior art, conventional mold tools require very accurate tolerances to be achieved between the alignment of the sides of core and cavity insert blocks. To achieve the precise alignment, very accurate tolerances must be held on a long tolerance loop which involves not only the core and cavity insert blocks, but also elements of the mold base that are supporting the insert blocks. If the core and cavity insert blocks of a mold tool do not align precisely throughout the mold tool's life, excessive wear of mating shut out faces occurs which in turn causes a degradation in the quality of components that can be molded by that tool.

Usually, in technical mold tools in the prior art, the core insert block and cavity insert block are either recessed into pockets in the mold base or fixed onto the front face of the mold base plates. The mold base is manufactured to ensure a high precision and consistency of alignment. The prior art attempts to achieve the high precision and consistency of alignment of the insert blocks by using guide pillars and on more demanding mold tools extra alignment blocks are mounted separately onto the mold base plates. These alignment blocks are so arranged to engage with each other and control the mold base alignment before the critical mating features of the core and cavity insert blocks come into engagement with one another. This prior art alignment system requires very accurate positioning of the core and cavity insert blocks on the mold base plates to ensure that the accurate alignment control achieved in the mold base system is maintained through and including the shut off faces between the core and cavity insert blocks. The positioning of the core and cavity insert blocks is achieved by locating both the core and cavity insert blocks in accurately machined pockets or accurately keying the core and cavity insert blocks onto the mold base plates. The positioning of the insert blocks in this manner is a difficult and time consuming process and provides no compensation adjustment for wear or other factors affecting accuracy.

In other prior art mold making, for example, packaging containers and PET bottle preform molds, multiple cavity sets of core and cavity insert blocks are used on one mold base system. The individual alignment between each core and cavity insert block set is achieved by means of a conical alignment feature well known to those skilled in the art. In this alignment system, the cavity insert block is accurately located on the mold base cavity plate, particularly to ensure alignment with the runner system. The core insert block is mounted on the mold base core plate in such a way that its position can be adjusted before it is finally clamped into position with fixing screws/bolts. During the final assembly of the mold, or if adjustment is required during the life of the mold, the core insert blocks are assembled in such a manner that they can "float" that is, the screws are not fully tightened. As the two halves of the mold are bought together, each core insert block finds alignment with its mating cavity insert block by means of the individual conical alignment feature in each core and cavity insert block pair. When the mold is assembled and in a closed position, the core insert blocks are then finally clamped into position. The positioning of the insert blocks in this manner is also difficult and time consuming in the initial set-up and also during subsequent adjustment to compensate for wear or other factors affecting accuracy.

Although this conical self-alignment feature is known in some sectors of the molding industry as stated above, for example, packaging containers and PET bottle preform molds, a similar solution is not satisfactory and suitable for use with technical molds such as the molds used to produce products and parts in the telecom sectors.

Accordingly, it is an object of the present invention to provide an alignment system for core and cavity insert block pairs that overcomes the problems and drawbacks of prior art alignment systems.

SUMMARY OF THE INVENTION

In accordance with a broad aspect of the invention, an alignment system for injection mold insert blocks in a mold tool is presented. The alignment system includes a core insert block, a cavity insert block, and a plurality of alignment bars each of which alignment bars is fixedly mounted in an alignment channel located on a corresponding respective different side of one of the core insert block or cavity insert block. A mating alignment channel is located on a corresponding respective different side of the other of the core insert block or cavity insert block for receiving a respective alignment bar when the core insert block and the cavity insert block are moved into a closed operative position. A portion of one end of the fixedly mounted alignment bar projects substantially perpendicularly a first pre-defined distance above the plane of a molding face surface of the core insert or cavity insert block to which the alignment bar is fixedly mounted for sliding engagement with the corresponding side mating alignment channel. A portion of an end opposite the one end of the fixedly mounted alignment bar projects substantially perpendicularly a second pre-defined distance below the plane of a mold base plate facing surface defining keys for insertion into pockets formed in the mold base plate of a first mold base to fixedly position the one of the core insert block or cavity insert block on the mold base plate of the first mold base. The other the core insert block or cavity insert block is carried on the mold base plate of a second mold base arranged for co-operative action with the first mold base wherein the position of the other of the core insert block or cavity insert block is moved into alignment with the one of the core insert block and the cavity insert block when the first and second mold base are moved toward one another in the closing direction of the one and the other of the core insert block and cavity insert block during operation of the mold tool.

In a further aspect of the invention, the alignment bar has a rectangular cross section with spaced apart oppositely disposed sides and spaced apart oppositely disposed ends. The alignment bar sides may further have chamfered side edges and the alignment bar ends may further have chamfered end edges to allow easy engagement with the alignment channels on the insert blocks.

In a still further aspect of the invention, the alignment channel has complementary chamfers for mating with the alignment bar chamfered end edges.

BRIEF DESCRIPTION OF THE DRAWINGS

Additional objects, features and advantages of the present invention will become readily apparent from the following written description taken in conjunction with the drawings wherein.

WRITTEN DESCRIPTION OF PREFERRED EMBODIMENTS

Figure 1:
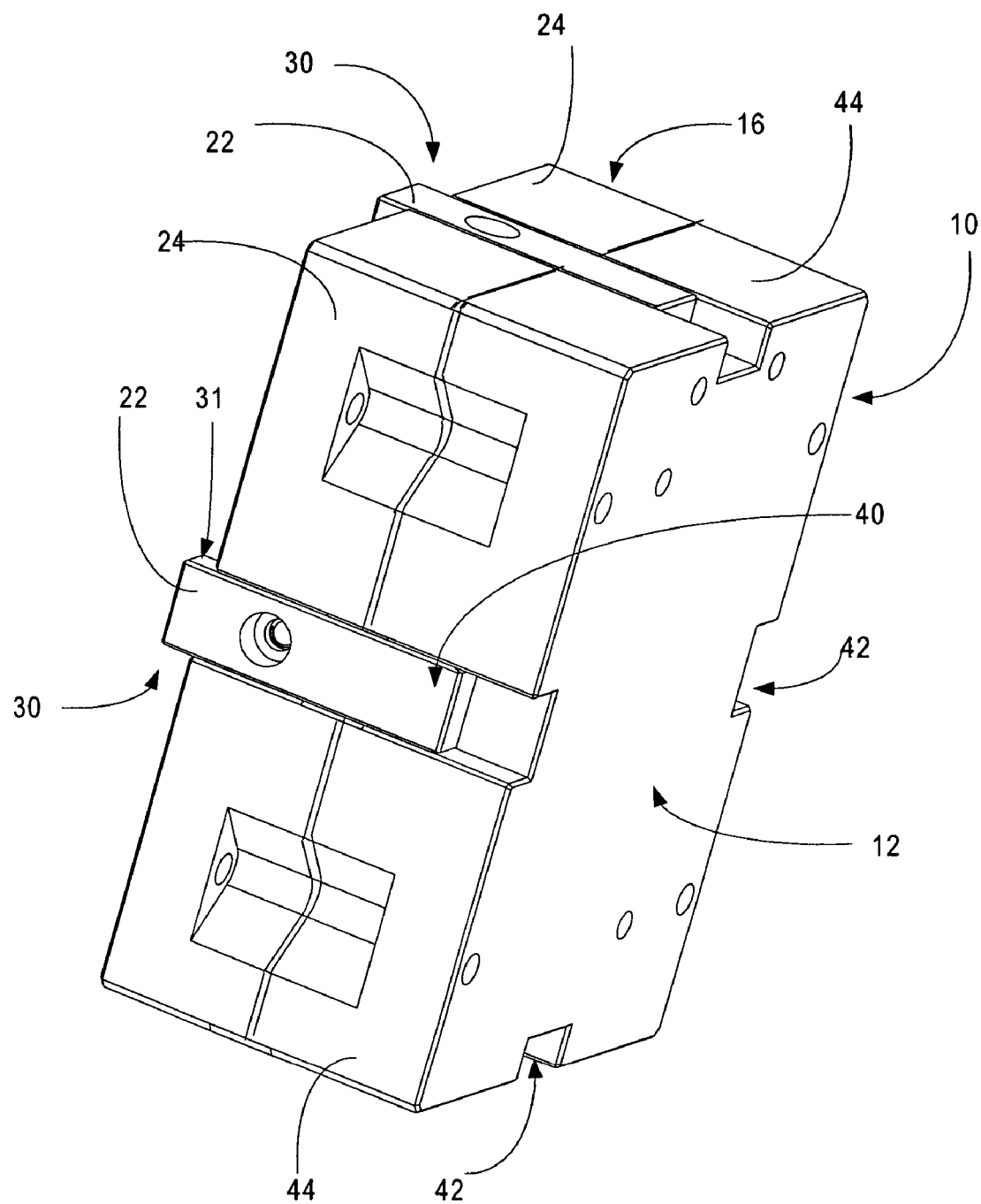
FIG. 1 is a schematic perspective view showing the core and cavity insert blocks in a closed operative position aligned and in registration with one another utilizing the alignment system embodying the present invention.
Figure 2:
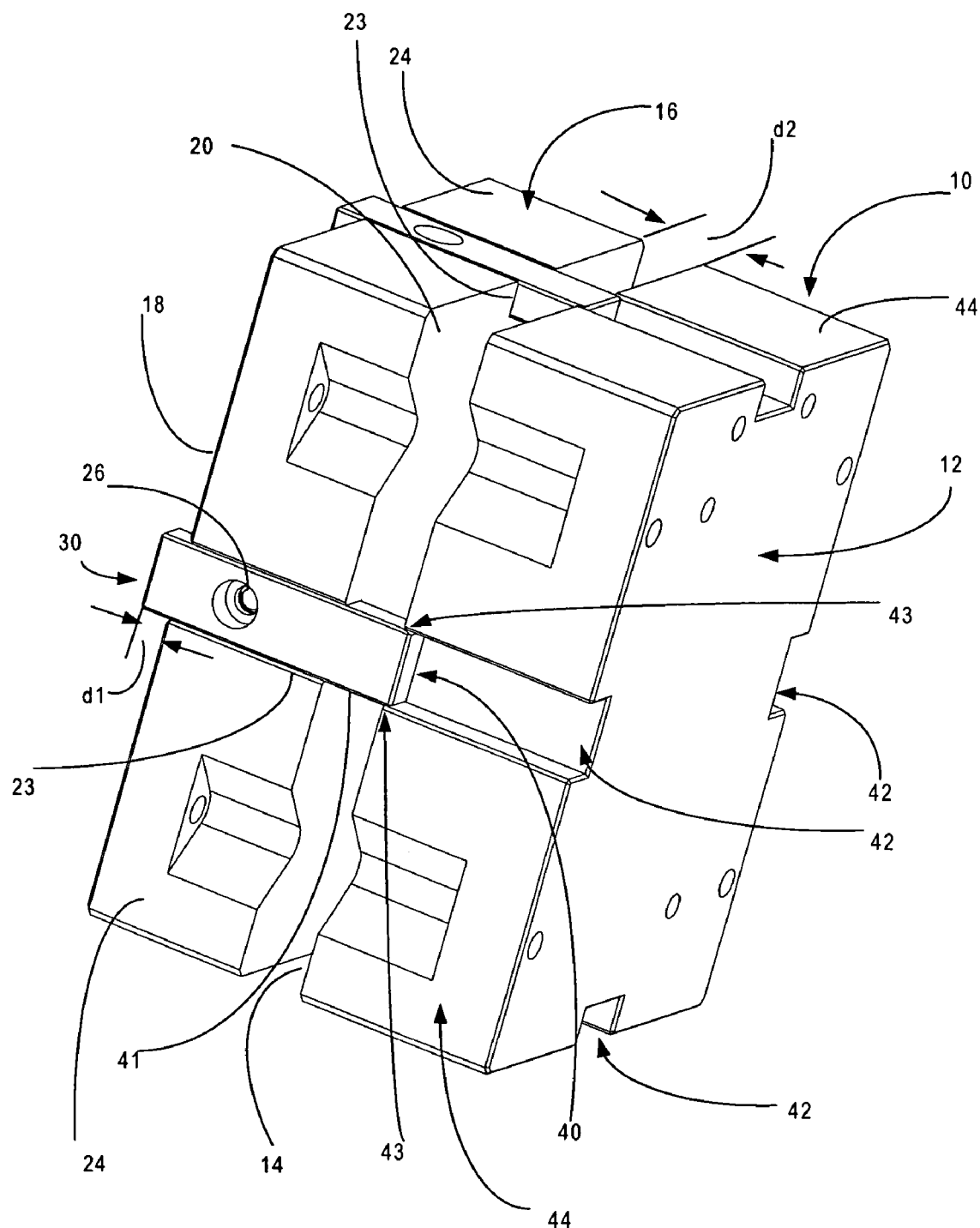
FIG. 2 is a schematic perspective view showing the core and cavity insert blocks positioned at the point of alignment bar engagement with the mating alignment channel.

Turning now to the drawings and considering the invention in further detail, an alignment system embodying the present invention for self alignment of core and cavity insert blocks in an injection mold tool is disclosed in an exemplary embodiment. The alignment system is incorporated within the injection mold cavity and allows the adjustment and alignment of each core insert block and cavity insert block set or pair during the assembly of the injection mold tool thereby eliminating the need to rely on the mold base accuracy for alignment and position of the insert blocks. For purposes of explanation of the invention and to gain a better understanding, the invention is described by way of the following illustrative example. A core insert block generally designated 10 has a mold base facing side major surface 12 and an oppositely disposed molding face surface generally designated 14. A cavity insert block generally designated 16 includes a mold base facing major surface generally designated 18 and an oppositely disposed molding face surface generally designated 20. The core insert block 10 and cavity insert block 16 are arranged such that their respective molding face surfaces 14, 20 are in face-to-face relationship with one another and when moved into the closed operative position as illustrated in FIG. 1, they are in condition and operative position for molding the corresponding product defined by the mold tool as known to those skilled in the art.

Figure 4:
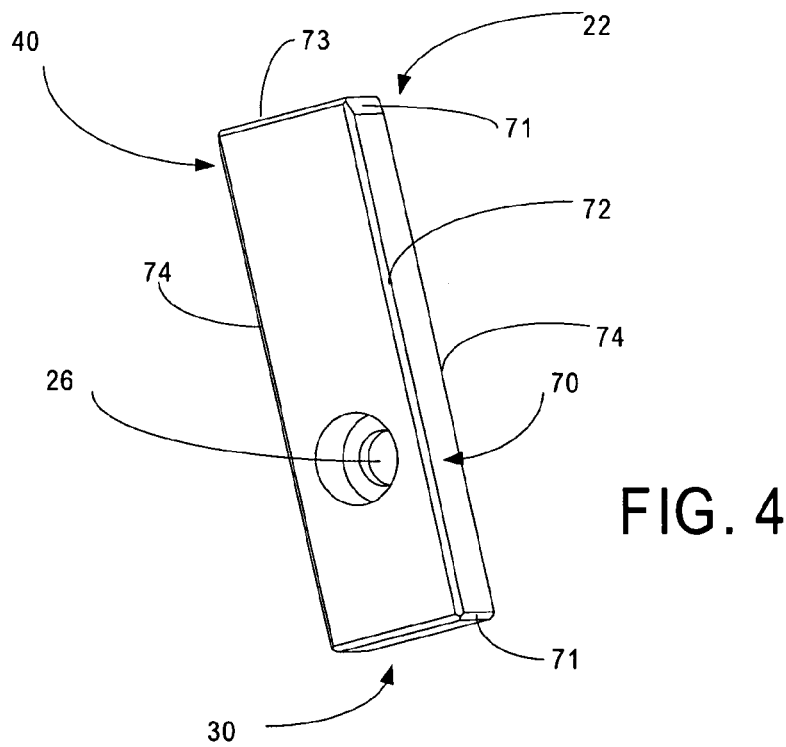
FIG. 4 is a schematic perspective view of an alignment bar used with the alignment system embodying the present invention.

The alignment system includes a number of alignment bars 22 as best illustrated in FIG. 4, each of which is fixedly mounted in an alignment channel 23 defined in each respective side 24 of the cavity insert block 16. The alignment bars 22 are preferably attached to the midpoint on each side 24 of the cavity insert block 16 by means of a screw inserted through the screw mounting hole generally designated 26 and threaded into the cavity insert block material in a well known and suitable manner to securely attach the alignment bar 22 to the cavity insert block 16.

Figure 5:
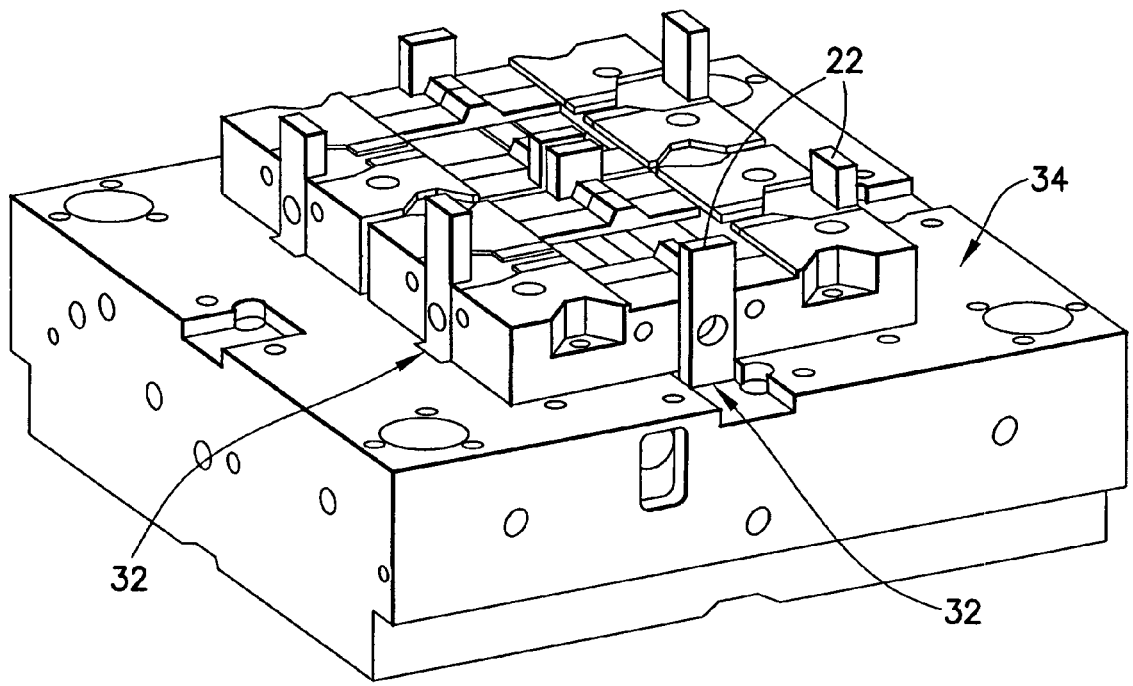
FIG. 5 is a schematic perspective view showing the cavity insert block with alignment bars attached positioned and located on the mold base plate of the mold base.
Figure 6:
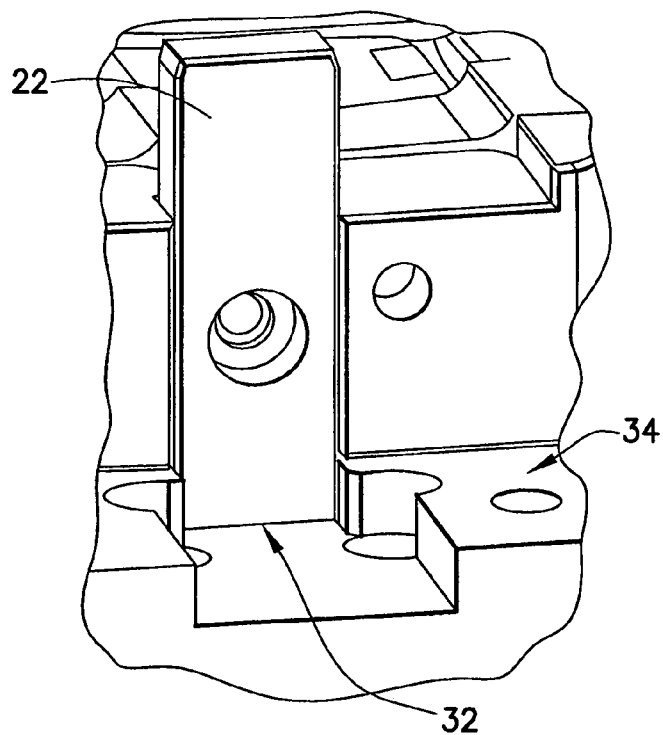
FIG. 6 is a fragmentary, schematic perspective view showing the alignment bar keyed in a pocket on the mold base plate.

The alignment bars 22 are of a suitable length and have a portion 31 of one end 30 which projects a predefined distance d1 below the plane of the mold base facing surface 18. The projection portion of the alignment bars 22 define keys for insertion into corresponding precision pockets 32 formed in the mold base plate 34 of the mold base 36 to locate and precisely position the cavity insert block 16 to the mold base plate 34 as shown for example in FIGS. 5 and 6.

A portion 41 of the opposite end 40 of the alignment bar 22 projects substantially perpendicularly a predefined distance d2 above the plane of the molding face surface 20. The projection portion 41 of the alignment bar 22 slidingly engages in a corresponding respective mating alignment channels 42 defined in the sides 44 of the core insert block 10 when the cavity insert block 16 and core insert block 10 are moved toward one another in the closing direction during the operation of the mold tool. The mating alignment channel 42 is sized and shaped to receive the alignment bar 22.

Figure 3:
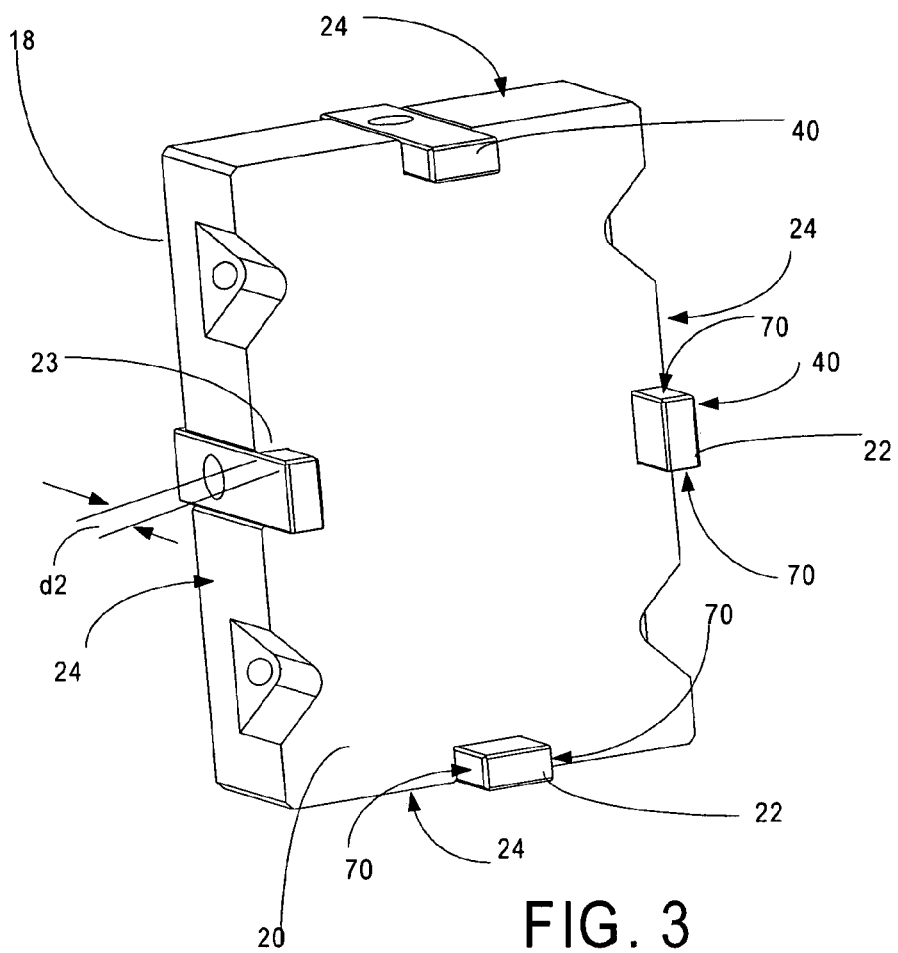
FIG. 3 is a schematic perspective view showing a cavity insert block with the alignment bars attached.

The alignment bars 22 are made of a suitable material and hardness to ensure that they are sufficiently robust to force the insert block with which it engages into alignment and to withstand repeated engagement and disengagement during the opening and closing of the mold as part of its normal operating cycle. Although the alignment bar 22 may be of any suitable shape to carryout the intended function, it is preferable that the alignment bar have a rectangular cross section with spaced apart oppositely disposed sides 74 and spaced apart oppositely disposed ends 30, 40 to provide a good surface bearing area generally designated 70 as best seen in FIG. 3 on engagement with the mating alignment channel. It is also desirable that the alignment bar have a small chamfer or beveled edge 72 on its sides 74 and on the edges 73 or the corners 71 of its ends 30, 40 which are arranged to allow easy engagement with the alignment channels 42 on the insert blocks. The alignment channel 42 may also have complementary chamfers 43 for mating with the alignment bar chamfered ends to further facilitate easy engagement of the alignment bar with the alignment channel.

In general, the cavity insert block 16 is keyed to the mold base plate 34 to ensure alignment between the resin feed system, for example a hot runner nozzle, and a mating feature on the cavity insert block 16. Alternately, in molds where the resin feed system is via the core insert block 10, the alignment bars 22 can be mounted to the core insert block 10 in a similar as described above with respect to the cavity insert block 16. The insert block not having alignment bars attached to it would be mounted to the face of the mold base plate in such a way that its position can be adjusted during assembly of the mold tool that is, the insert block that is not accurately keyed onto the mold base plate as described above.

Figure 7:
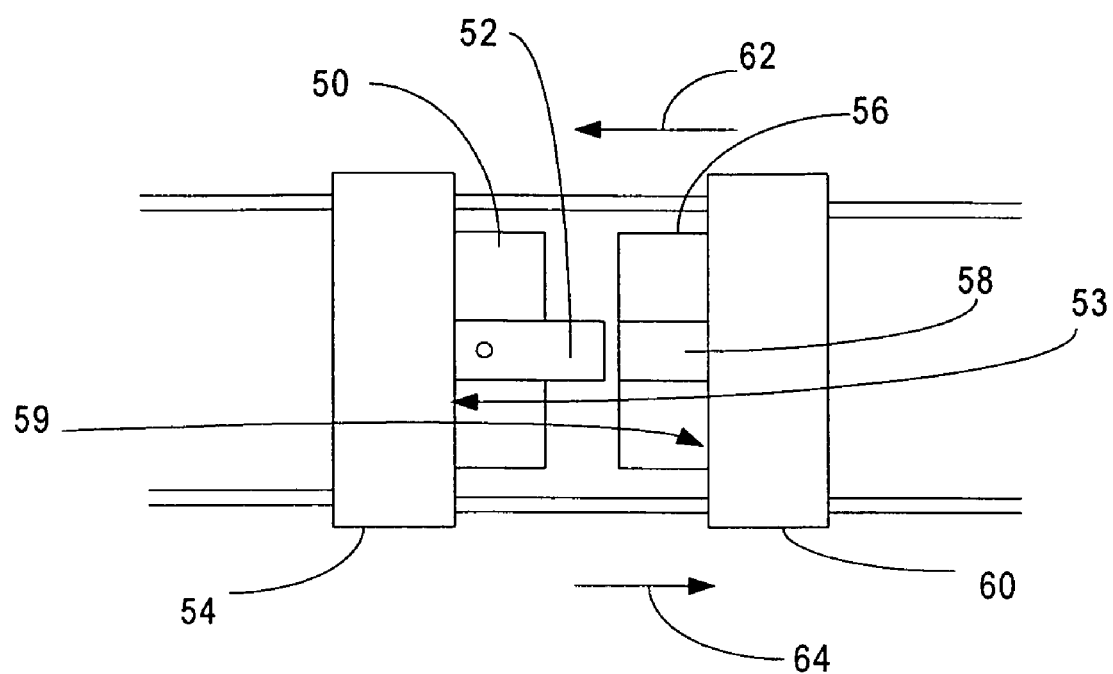
FIG. 7 is a schematic representation of a mold tool showing the core and cavity insert blocks carried on respective mold bases in an injection molding machine.

As schematically illustrated in FIG. 7, an insert block 50 with the attached alignment bars 52 is keyed and located on the faceplate 53 of the mold base 54. The other insert block 56 having the mating alignment channels 58 is arranged to be carried on the mold base faceplate 59 of the mold base 60 such that when the mold tool is operated to the closed position as indicated by the direction arrow 62, the alignment bar 52 slidingly engages with the mating alignment channel 58 to self-align the insert block 56 with the insert block 50. When the mold base 60 moves in the opening direction as indicated by the direction arrow 64 the mold is open to release injection mold part. As evident from the above discussion, the orientation of the alignment bars 52 is in line with the opening/closing direction of the insert blocks 50, 56 during operation of the mold tool.

As mentioned above, it is preferable to locate the alignment bars at the midpoint of each side of the insert blocks to eliminate or substantially minimize any effects of thermal expansion differences between the core insert block and cavity insert block. If other mechanical constraints in the tool design do not allow the alignment bars to be located at the midpoint of each side, the alignment bar can be located to any suitable position which retains the benefit of the individual cavity system alignment however, the alignment accuracy may be degraded particularly if the mold tool experiences significant thermal expansion during operation.

The accuracy of the alignment of the insert blocks may be further improved through adjustment with the complete mold in the correct operating orientation to account for any gravitational effects and at the correct working temperature that is intended for the mold to account for thermal expansion of the inset blocks. Ideally, the alignment of each set or pair of core and cavity insert blocks is adjusted with the tool mounted in a molding machine and at the working temperature.

An alignment system for injection mold insert blocks in a mold tool has been described above. It is understood that numerous changes and modifications may be made by those skilled in the art for example, the cross section of the alignment bars and corresponding alignment channels may have cross sectional areas other than rectangular and may be mounted to the insert block by means other than a screw mounting. Accordingly, the invention has been described by way of illustration rather than limitation.

The invention claimed is:

1. An alignment system for injection mold insert blocks in a mold tool comprising:
   a core insert block;
   a cavity insert block;
   a plurality of alignment bars each of which is fixedly mounted in an alignment channel defined in a corresponding respective different side of one of the core insert block or cavity insert block and arranged for fixedly positioning said one of said core insert block or cavity insert block on a mold base plate of a first mold base, and
   a mating alignment channel defined in a corresponding respective different side of the other of the core insert block or cavity insert block configured for receiving in sliding engagement a said respective alignment bar when said core insert block and said cavity insert block are moved into a closed operative position.

2. The alignment system as defined in claim 1 wherein a portion of one end of said fixedly mounted alignment bar projects substantially perpendicularly a first pre-defined distance above the plane of a molding face surface of the core insert or cavity insert block to which said alignment bar is fixedly mounted for sliding engagement with said corresponding side mating alignment channel.

3. The alignment system as defined in claim 2 wherein a portion of an end opposite said one end of said fixedly mounted alignment bar projects substantially perpendicularly a second pre-defined distance below the plane of a mold base plate facing surface defining keys for insertion into pockets formed in the mold base plate of said first mold base to fixedly position said one of the core insert block or cavity insert block on said mold base plate of said first mold base.

4. The alignment system as defined in claim 3 wherein the other said core insert block or cavity insert block is carried on the mold base plate of a second mold base arranged for co-operative action with said first mold base wherein the position of said other of said core insert block or cavity insert block is moved into alignment with said one of said core insert block and said cavity insert block when said first and second mold base are moved toward one another in the closing direction of said one and the other of said core insert block and said cavity insert block during operation of the mold tool.

5. The alignment system as defined in claim 1 wherein said alignment bar has a rectangular cross section with spaced apart oppositely disposed sides and spaced apart oppositely disposed ends.

6. The alignment system as defined in claim 5 wherein said alignment bar sides have chamfered side edges.

7. The alignment system as defined in claim 5 wherein said alignment bar ends have are configured with chamfered end edges.

8. The alignment system as defined in claim 7 wherein said alignment channel has complementary chamfers for mating with said alignment bar chamfered end edges.

9. An alignment system for injection mold insert blocks in a mold tool comprising:
   a core insert block;
   a cavity insert block;
   a plurality of alignment bars each of which is fixedly mounted in an alignment channel located on a corresponding respective different side of one of the core insert block or cavity insert block, and configured so that a portion of one end of said fixedly mounted alignment bar projects substantially perpendicularly a first pre-defined distance above the plane of a molding face surface of the core insert or cavity insert block to which said alignment bar is fixedly mounted and a portion of an end opposite said one end of said fixedly mounted alignment bar projects substantially perpendicularly a second pre-defined distance below the plane of a mold base plate facing surface defining keys for insertion into pockets formed in the mold base plate of a first mold base to fixedly position said one of the core insert block or cavity insert block on said mold base plate of said first mold base, and
   a mating alignment channel located on a corresponding respective different side of the other of the core insert block or cavity insert block configured and arranged for receiving in sliding engagement a said respective alignment bar when said core insert block and said cavity insert block are moved into a closed operative position.

10. The alignment system as defined in claim 9 wherein the other said core insert block or cavity insert block is carried on the mold base plate of a second mold base arranged for co-operative action with said first mold base wherein the position of said other of said core insert block or cavity insert block is moved into alignment with said one of said core insert block and said cavity insert block when said first and second mold base are moved toward one another in the closing direction of said one and the other of said core insert block and said cavity insert block during operation of the mold tool.

11. The alignment system as defined in claim 9 wherein said alignment bar has a rectangular cross section with spaced apart oppositely disposed sides and spaced apart oppositely disposed ends.

12. The alignment system as defined in claim 11 wherein said alignment bar sides have chamfered side edges.

13. The alignment system as defined in claim 11 wherein said alignment bar ends have are configured with chamfered end edges.

14. The alignment system as defined in claim 13 wherein said alignment channel has complementary chamfers for mating with said alignment bar chamfered end edges.

15. Apparatus, comprising;
- means for aligning a core insert block and a cavity insert block in an injection mold tool in response to an alignment force applied by a plurality of alignment bars each of which is fixedly mounted in an alignment channel defined in a corresponding respective different side of one of the core insert block or cavity insert block;
- means at one end of said alignment bar arranged for fixedly positioning said one of said core insert block or cavity insert block on a mold base plate of a first mold base, and
- means defining a mating alignment channel in a corresponding respective different side of the other of the core insert block or cavity insert block for receiving the alignment force in response to a said respective alignment bar being received in sliding engagement in a respective alignment channel in response to moving the core insert block and said cavity insert block into a closed operative position.

16. The apparatus as defined in claim 15 wherein said alignment bar one end means further comprises a portion of said one end of said fixedly mounted alignment bar projecting substantially perpendicularly a first pre-defined distance above the plane of a molding face surface of the core insert or cavity insert block to which said alignment bar is fixedly mounted for sliding engagement with said corresponding side mating alignment channel.

17. The apparatus as defined in claim 16 wherein said alignment bar includes means defining keys for insertion into pockets formed in the mold base plate of said first mold base to fixedly position said one of the core insert block or cavity insert block on said mold base plate of said first mold base, said keys being located and arranged at the end opposite said alignment bar one end means and further comprising a portion of said alignment bar projecting substantially perpendicularly a second pre-defined distance below the plane of a mold base plate facing surface.

* * * * *